United States Patent
Umezaki et al.

(10) Patent No.: US 8,305,463 B2
(45) Date of Patent: Nov. 6, 2012

(54) VIDEO DATA SAVING DEVICE AND VIDEO DATA SAVING METHOD

(75) Inventors: Yasushi Umezaki, Kawasaki (JP); Tsuyoshi Miura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 11/513,094

(22) Filed: Aug. 31, 2006

(65) Prior Publication Data

US 2007/0216780 A1    Sep. 20, 2007

(30) Foreign Application Priority Data

Mar. 15, 2006  (JP) ................. 2006-071080

(51) Int. Cl.
*H04N 5/76* (2006.01)
*H04N 9/80* (2006.01)

(52) U.S. Cl. ............... 348/231.5; 348/231.3; 348/231.2; 348/231.99; 386/248; 386/247; 386/239

(58) Field of Classification Search .................. 348/231, 348/211, 143, 231.99–231.6; 386/239, 246–248, 386/253
See application file for complete search history.

(56) References Cited

U.S. PATENT DOCUMENTS

| | | | | |
|---|---|---|---|---|
| 5,153,729 A | * | 10/1992 | Saito ......................... | 348/231.6 |
| 5,523,799 A | * | 6/1996 | Hattori et al. ................. | 348/715 |
| 5,590,306 A | * | 12/1996 | Watanabe et al. ............. | 711/115 |
| 6,226,329 B1 | * | 5/2001 | Ishibashi .................. | 375/240.26 |
| 6,393,196 B1 | | 5/2002 | Yamane et al. | |
| 6,577,563 B1 | | 6/2003 | Iwamoto | |
| 6,757,008 B1 | * | 6/2004 | Smith ........................... | 348/143 |
| 6,795,642 B2 | * | 9/2004 | Matsumoto et al. .......... | 386/109 |
| 2001/0031126 A1 | | 10/2001 | Ochiai et al. | |
| 2003/0133614 A1 | * | 7/2003 | Robins et al. ................. | 382/219 |
| 2003/0193561 A1 | * | 10/2003 | Tecchiolli et al. ............ | 348/143 |
| 2004/0158869 A1 | * | 8/2004 | Safran et al. .................. | 725/105 |
| 2005/0041117 A1 | * | 2/2005 | Yamagishi ................. | 348/231.2 |
| 2005/0044258 A1 | * | 2/2005 | Nakamura ................... | 709/232 |
| 2005/0128318 A1 | * | 6/2005 | Leow et al. ................ | 348/231.5 |
| 2005/0166086 A1 | * | 7/2005 | Watanabe ........................ | 714/6 |

FOREIGN PATENT DOCUMENTS

JP          10-070705        3/1998

(Continued)

OTHER PUBLICATIONS

Office Action issued in corresponding Korean Patent Application No. 10-2006-0085045; mailed on Mar. 14, 2008.

(Continued)

*Primary Examiner* — John Villecco
*Assistant Examiner* — Mark Monk
(74) *Attorney, Agent, or Firm* — Staas & Halsey LLP (57) ABSTRACT

A video data transmitting device 30 manages storage areas 31*a*, 31*b* of a memory card 31 by equally segmenting these storage areas into partitions whose capacities are equal to each other. Image data forming video data is stored piece by piece in each partition in the sequence from a head partition toward a tail partition. Then, the image data is overwritten sequentially from the oldest, whereby the storage areas 31*a*, 31*b* are always temporarily stored with N-pieces of image data starting from a point of the time when recording the image data and ending to a point of time tracing back for a predetermined period of time.

8 Claims, 4 Drawing Sheets

FOREIGN PATENT DOCUMENTS

| | | |
|---|---|---|
| JP | 2001-126380 | 5/2001 |
| JP | 2001-339677 | 12/2001 |
| JP | 2003-153165 | 5/2003 |
| JP | 2004-71033 | 3/2004 |
| KR | 1999-0071538 | 9/1999 |
| KR | 2003-0082437 | 10/2003 |
| KR | 10-2004-0083350 | 10/2004 |

OTHER PUBLICATIONS

Japanese Office Action issued Jun. 22, 2010 in corresponding Japanese Patent Application 2006-071080.

Japanese Notice of Reason for Rejection mailed Feb. 15, 2011 for corresponding Japanese Patent application 2006-071080.

* cited by examiner

VIDEO DATA SAVING DEVICE AND VIDEO DATA SAVING METHOD

BACKGROUND OF THE INVENTION

1. Field of the Invention

The present invention relates to a device for and a method of saving video data.

2. Related Background Art

As broadly known, there is a case example of configuring a remote monitor system by utilizing an existing communications infrastructure. In this case example, monitor cameras are installed in respective monitoring places and are connected to a monitor and to a computer at a head office through an encoder, the communications infrastructure and a decoder in this sequence. The video data generated by the monitor camera is converted by the encoder into a format pursuant to a communications protocol and then transmitted to the decoder. Then, the monitor and the computer, based on the video data transferred from the decoder, display pictures and accumulate the data in a database.

By the way, there is a case of being unable to obtain a high communication speed depending on the existing communications infrastructure. In this case, if adopting an operation mode of always transmitting the video data from all the monitor cameras to the computer at the head office, traffic gets concentrated with the result that a congested state occurs. Therefore, some of the remote monitor systems take such an operation mode that in the normal status, the video data are accumulated in the storage device on the site without transmitting the video data, and, if some kind of event occurs, the video data starting from the occurrence of this event and ending to a point of time tracing back for a predetermined period of time are transmitted to the computer at the head office. According to this operation mode, the remote monitor system can be configured without applying any load on the network.

[Patent document 1] Japanese Patent Application Laid-Open Publication No. 2001-339677

[Patent document 2] Japanese Patent No. 2807456

In the operation mode that restrains the network load as described above, the storage device accumulated with the video data of the monitor cameras involves adopting a device that stores the data on an endless video cassette tape and a device that converts the data into digital video data and stores the converted video data on a HDD (Hard Disk Drive).

The endless tape, however, has problems in terms of durability such as deterioration of image quality and stretching of the tape itself due to the consecutive use and a backlash of the movable unit due to nonstop activation. Therefore, the administrator must frequently perform an operation of visiting the respective places and replacing the endless tapes.

On the other hand, some of the HDDs are extremely expensive enough to guarantee the nonstop activation for 24 hours. The HDD is a precise device and has therefore such a problem that an operating failure is caused depending on an installation environment such as a temperature, vibrations and dusts irrespective of whether its price is high or low. Hence, the administrator must expend a great amount of cost for installing the HDDs under a special environment provided with air conditioning equipment etc especially by restraining a cost for building up a network in a way that utilizes the existing communications infrastructure.

SUMMARY OF THE INVENTION

It is an object of the present invention, which was devised in view of the problems inherent in the prior arts described above, to eliminate a necessity of frequently exchanging a storage medium and to prevent a failure of operation due to an installation environment in the case of adopting an operation mode of saving, on the site, video data starting from when recorded up to a point just before a predetermined period of time in the video data consecutively generated by a camera.

A video data saving device contrived for accomplishing the above object comprises a partition defining unit segmenting a whole storage area of a storage medium constructed of a flash memory and defining a plurality of partitions of which capacities are equal to each other on the segmented areas, a writing unit attaching, each time image data forming video data is inputted, time information to the image data and writing the image data attached with the time information to the partition stored with the oldest image data in the storage area, and a storing unit storing, each time the writing unit writes the image data to any one of the partitions, the time information written to the partition and a piece of information specifying a location of the partition in the storage area in a way that associates these items of information with each other.

With this configuration, the respective pieces of image data are written impartially and on average to the storage areas of the storage medium, and hence it does not happen that a lifetime of the storage medium is terminated without consuming up every area of the storage medium because of part of the storage areas reaching a write upper limit count. As a result, there is no necessity of frequently replacing the storage medium.

Further, the storage medium is constructed of a flash memory and has therefore none of a movable unit as in the case of a disk type storage medium. Hence, there occurs neither a backlash of the movable unit due to nonstop activation nor a failure of operation due to an installation environment.

It should be noted that the video data saving device according to the present invention may further comprise a status switchover unit setting, when instructed to store the image data, a predetermined number of partitions to which the image data are written just before a point of time when instructed in a write disabled status of the image data. In this case, it is required that the writing unit, when writing the image data to any one of the partitions, writes the image data to the partition stored with the oldest image data in the partitions excluding the partitions set in the write disabled status of the image data.

Further, flag information written to the partition together with the image data and the time information may define whether the partition is a partition to which the image data can be written or not. In this case, it is required that the writing unit, when writing the image data to any one of the partitions, attaches to the image data, together with the time information, a piece of flag information showing a status purporting that the image data is permitted to be overwritten, and writes the image data attached with these items of information to the partition stored with the oldest image data in the partitions excluding the partitions to which the flag information showing a status purporting that the image data is inhibited from being overwritten. Moreover, it is necessary to further include the status switchover unit switching over, when receiving a predetermined instruction, the flag information of a predetermined number of partitions to which the image data are written just before a point of the time when instructed, from the overwrite permission status to the overwrite inhibition status.

Further, a video data saving method devised to accomplish the above object comprises segmenting equally a whole storage area of a storage medium constructed of a flash memory and defining a plurality of partitions of which capacities are equal to each other on the segmented areas, attaching, each time image data forming video data is inputted, time information to the image data and writing the image data attached with the time information to the partition stored with the oldest image data in the storage area, and storing, each time the image data is written to any one of the partitions, the time information written to the partition and a piece of information specifying a location of the partition in the storage area in a way that associates these items of information with each other.

Accordingly, the video data saving device according to the present invention functions as the device that actualizes this video data saving method.

As explained above, according to the present invention, it is possible to eliminate the necessity of frequently exchanging the storage medium and to prevent the failure of operation due to the installation environment in the case of adopting the operation mode of saving, on the site, video data starting from when recorded up to the point just before the predetermined period of time in the video data consecutively generated by the camera.

DETAILED DESCRIPTION OF THE PREFERRED EMBODIMENT

Next, a best mode (embodiment) for carrying out the present invention will hereinafter be described in detail with reference to the accompanying drawings.

To start with, architecture of a remote monitor system in the present embodiment will be explained.

Figure 1:
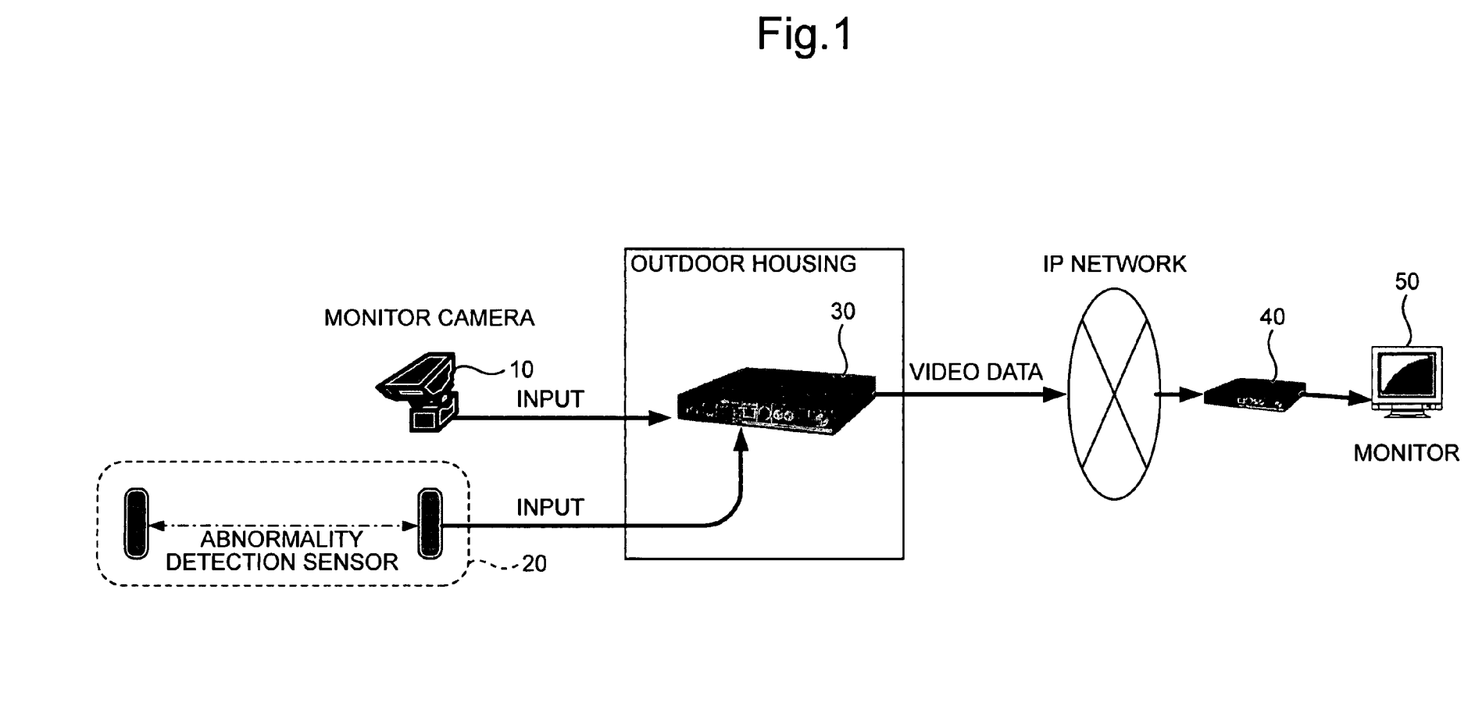
FIG. 1 is a diagram showing architecture of a remote monitor system in the present embodiment.

FIG. 1 is a diagram showing the architecture of the remote monitor system in the present embodiment.

As illustrated in FIG. 1, the remote monitor system in the present embodiment includes at least one group of monitor cameras 10, an abnormality detection sensor 20 and a video data transmitting device 30 and at least one group of vide data receiving devices 40 and a monitor 50.

The monitor camera 10 is a device for generating video data by capturing an image of a monitor object, and is installed on a pole, a roof and a wall in such a way that a field of view is directed to the monitor object.

The abnormality detection sensor 20 is a sensor for detecting that abnormality occurs in the monitor object. The abnormality detection sensor 20 is specifically exemplified such as a so-called infrared-ray sensor and a so-called photoelectric tube measuring device. The infrared-ray sensor is a sensor that outputs a signal indicating occurrence of the abnormality when the infrared rays emitted from a light emitting element is intercepted by a trespasser. The photoelectric tube measuring device is a sensor that outputs the signal indicating the occurrence of the abnormality when the infrared rays emitted from a light receiving/emitting element and reflected by a reflector back to the light receiving/emitting element is intercepted by the trespasser.

The video data transmitting device 30 is a device that properly processes the video data generated by the monitor camera 10 and stores the processed video data for a fixed period of time, and, if requested by an unillustrated terminal device on an IP (Internet Protocol) network, transmits the video data to a video data receiving device 40 after converting the stored video data into a communication format pursuant to a communications protocol of the IP network. Note that a configuration of this video data transmitting device 30 will be explained later on. The video data transmitting device 30 is installed within a predetermined package so as not to be exposed to wind, rain and dusts.

The video data receiving device 40 is a device that properly processes the video data received from the video data transmitting device 30 via the IP network and outputs the processed video data to the monitor 50.

The monitor 50 is a device that displays a picture based on the video data inputted from the video data receiving device 40.

Next, a configuration of the video data transmitting device 30 will be explained.

Figure 2:
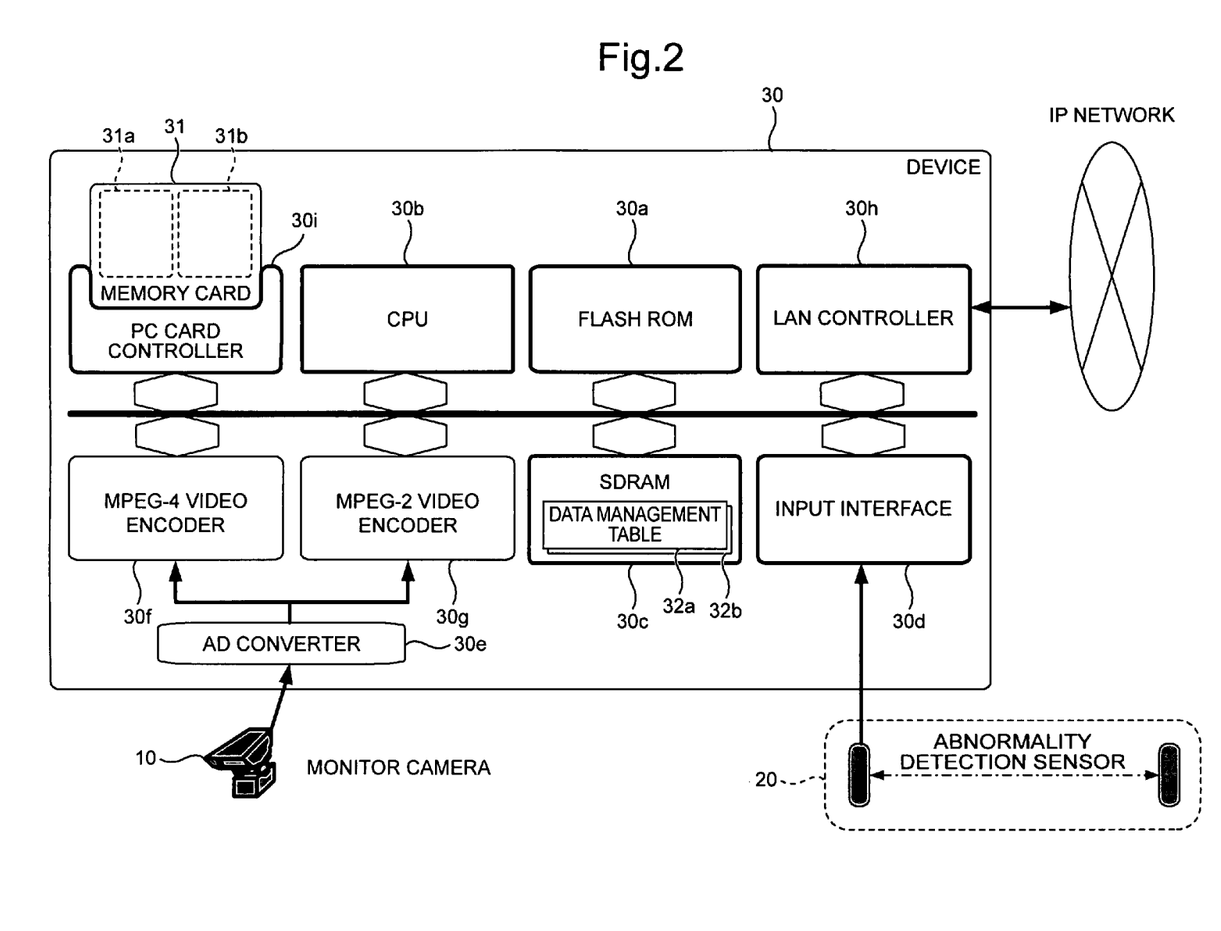
FIG. 2 is a diagram showing a configuration of a video data transmitting device.

FIG. 2 is a diagram showing the configuration of the video data transmitting device 30.

As depicted in FIG. 2, the video data transmitting device 30 includes a flash ROM (Read Only Memory) 30a, a CPU (Central Processing Unit) 30b, an SDRAM (Synchronous Dynamic Random Access Memory) 30c, an input interface 30d, an A/D (Analog/Digital) converter 30e, an MPEG-4 (Moving Picture Expert Group 4) video encoder 30f, an MPEG-2 video encoder 30g, a LAN (Local Area Network) controller 30h, and a PC (Personal Computer) card controller 30i.

The flash ROM 30a is a read-only storage device (memory) stored with a variety of programs and various items of data that are needed for exhibiting functions of the video data transmitting device 30. The CPU 30b is a control unit that executes the processes according to the programs stored in the flash ROM 30a. The SDRAM 30c is a readable/writable storage device in which an operation area for the CPU 30b is developed. The input interface 30d is an interface that notifies, upon receiving a signal showing occurrence of the abnormality from the abnormality detection sensor 20, the CPU 30b of this purport.

The A/D converter 30e is a converter for converting the video data generated by the monitor camera 10 into digital data from analog data. The MPEG-4 video encoder 30f is a compression device for compressing the video data converted into the analog data by the A/D converter 30e according to the MPEG-4 standards. The MPEG-2 video encoder 30g is a compression device for compressing the video data converted into the analog data by the A/D converter 30e according to the MPEG-2 standards.

The LAN controller 30h is an interface for transmitting and receiving the data to and from a relay device such as a router within the IP network. The PC card controller 30i is an interface having a slot to which an extension card referred to as a PC card (Trademark of Japan Electronic Industry Development Association and the PC Memory Card International Association of U.S.A.) is detachably attached, and operating this PC card as a memory card adapter, a wireless LAN interface and a PHS (Personal Handyphone System) data card.

Then, in the present embodiment, the memory card 31 having the built-in flash memory is attached to the PC card controller 30i through a memory card adapter type of PC card. As a matter of course, the PC card having the built-in flash memory may also be attached to the PC card controller 30i. In short, any types of the PC cards having the built-in flash memory including none of movable units are usable.

Note that the memory card 31 having the built-in flash memory is exemplified such as an SD (Secure Digital) card (Trademark of Toshiba Corp., Matsushita Electric Industrial Company Ltd., and SanDisk Corp of U.S.A.), Compact Flash (Trademark of SanDisk Corp. of U.S.A.) Memory Stick (Trademark of Sony Corp.), Smart Media (Trademark of Toshiba corp.) and xD (extreme Digital) Picture card (Trademark of Fuji Photo Film Co., Ltd. and Olympus Optical Co., Ltd.).

In the thus-constructed video data transmitting device 30, the storage area of the flash memory of the memory card 31 is segmented into a first storage area 31a stored with the video data outputted from the MPEG-4 video encoder 30f and into a second storage area 31b stored with the video data outputted from the MPEG-2 video encoder 30g.

Then, owing to a file system function based on the predetermined program in the flash ROM 30a, the video data outputted from the MPEG-4 video encoder 30f is stored in the first storage area 31a at all times, while the video data outputted from the MPEG-2 video encoder 30g is always stored in the second storage area 31b.

This file system function in the present embodiment, however, stores the video data in the first storage area 31a and in the second storage area 31b by a method different from the conventional file system function as by FAT (File Allocation Table).

Figure 3:
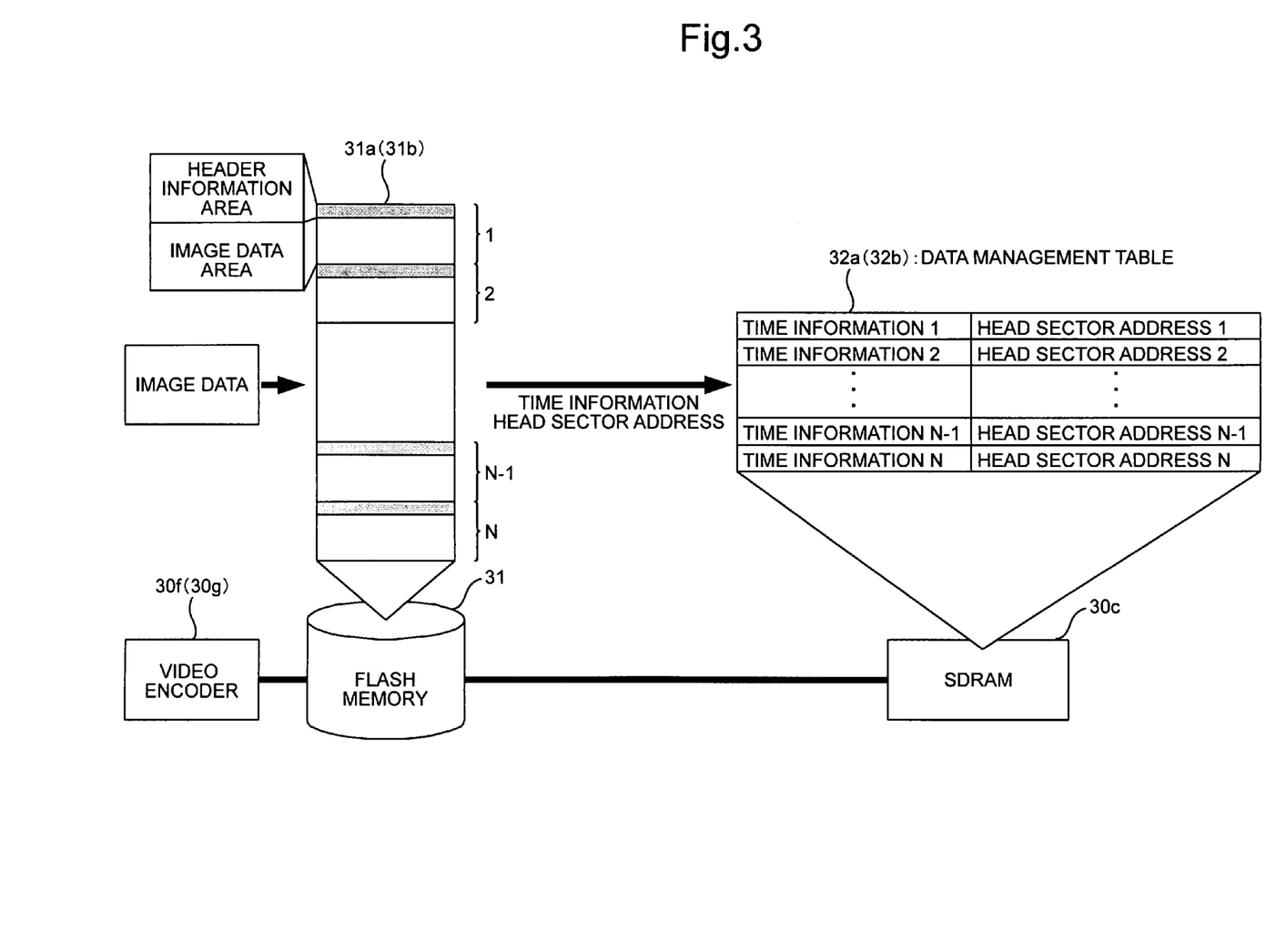
FIG. 3 is an explanatory diagram showing a method of recording (writing) video data in first and second storage areas.

FIG. 3 is an explanatory diagram showing the method of recording (writing) the video data in the first storage area 31a and in the second storage area 31b.

FIG. 3 illustrates one of the first storage area 31a and the second storage area 31b, however, as depicted in FIG. 3, each of the first storage area 31a and the second storage area 31b is partitioned equally into partitions having capacities equal to each other and thus managed. The capacity of one partition is equal to an addition of a size of image data forming the video data and a size of header information for managing the image data. The header information contains at least a piece of time information showing the time when starting storing the image data in one partition.

Accordingly, the file system function of managing the storage area in a way that partitions the storage area into the plurality of partitions corresponds to a partition defining unit according to the present invention.

Further, the respective partitions in one storage area are defined in their order as specified by 1, 2, ..., N−1, N in FIG. 3, wherein the image data forming the video data are stored one by one in the single partition in the sequence from a head partition down to a tail partition. Then, when the image data are stored to the last in the tail partition, a next set of image data is overwritten to the image data in the head partition, and the subsequent image data are overwritten to the image data in the respective partitions according to the order of the partitions (cyclically). Namely, it follows that the image data are overwritten in the sequence from the oldest, whereby N-pieces of image data starting from a point of the time when recording the image data and ending to a point of time tracing back for a predetermined period of time are, though the image data are sequentially recorded, always temporarily stored in this storage area.

Further, when the image data is stored in any one of the partitions, the time information indicating the storage start time is contained in the header information of the image data and is stored together with the image data in the same partition.

Accordingly, the file system function of sequentially writing the image data in the respective partitions corresponds also to a writing unit according to the present invention.

Moreover, when the image data is stored in anyone of the partitions of the storage area, the time information indicating the storage start time and a piece of information specifying a head sector address in that partition are sent to the SDRAM 30c. The SDRAM 30c is prepared with two data management tables 32 in which the time information and the head sector address information are stored in a way that associates these items of information with each other. Each time the image data is stored in the first storage area 31a, the time information and the head sector address information about this image data are stored in the first data management table 32a. Each time the image data is stored in the second storage area 31b, the time information and the head sector address information about this image data are stored in the second data management table 32b. As a matter of course, when the image data is overwritten to the image data that has already been stored in any one of the partitions, the time information and the head sector address information about this image data are overwritten to the time information and the head sector address information of the image data previously existing in this partition.

Accordingly, the file system function of storing the time information and the head sector address information in each of the first and second data management tables 32a, 32b within the SDRAM 30c, corresponds also to the storing unit described above.

Note that the first and second data management tables 32a, 32b are generated (developed) on the SDRAM 30c and therefore disappear when a main power source of the video data transmitting device 30 is cut off. Hence, the flash ROM 30a of the video data transmitting device 30 is stored with a program making the CPU 30b execute a process of reading, when switching ON (power-on) the main power source of the video data transmitting device 30, the header information and the head sector address information of each of the partitions of the first storage area 31a and the second storage area 31b of the memory card 31, and generating the first data management table 32a and the second data management table 32b on the SDRAM 30c.

By the way, if the data stored in the flash memory within the memory card 31 are managed by the general type of file system function such as FAT, an area for storing information for managing the data such as a FAT area in the FAT file system is ensured in the flash memory. Then, it follows that the general type of file system updates the information within the area concerned each time the data is stored in the memory card 31. The flash memory, however, has a rewritable (overwritable) upper limit count with respect to a storage element provided inside this flash memory. Therefore, if the flash memory is employed nonstop for 24 hours so as to continuously store the image data, a rewrite count of the data management information storage area reaches its upper limit count well earlier than a rewrite count of the image data storage area reaches its upper limit count, with the result that a lifetime of the flash memory is terminated before the image data storage area is thoroughly used up.

On the other hand, according to the present embodiment, as described above, the first and second data management tables 32a, 32b are generated on the SDRAM 30c. Consequently, if the first and second data management tables 32a, 32b are frequently accessed, the rewrite count of each of the first storage area 31a and the second storage area 31b uniformly increases, and hence there is neither the early termination of the lifetime of the flash memory nor any incompletely used area when the lifetime is terminated.

Herein, the rewrite upper limit count of the internal storage element of the flash memory is set to Wt [count], the storage capacity of the storage area of the flash memory is set to S [bit], and an encoding rate of each of the video encoders 30*f*, 30*g* is set to R [bit/sec], wherein the rewrite lifetime of the flash memory can be expressed such as $\{Wt \times (S/R)\}$ [sec].

Further, according to the present embodiment, a status switchover function, which is not provided in the first storage area 31*a*, is added to the second storage area 31*b*. To be specific, the image data forming the video data given from the MPEG-2 video encoder 30*g* are sequentially stored in the second storage area 31*b*. In this status, when the abnormality is detected by the abnormality detection sensor 20, the status switchover function sets, in a not-to-be-overwritten status, the image data stored before an elapse of the predetermined period of time since the detection of the abnormality in the image data stored in the second storage area 31*b*. This function is also based on the program within the flash ROM 30*a*.

Figure 4:
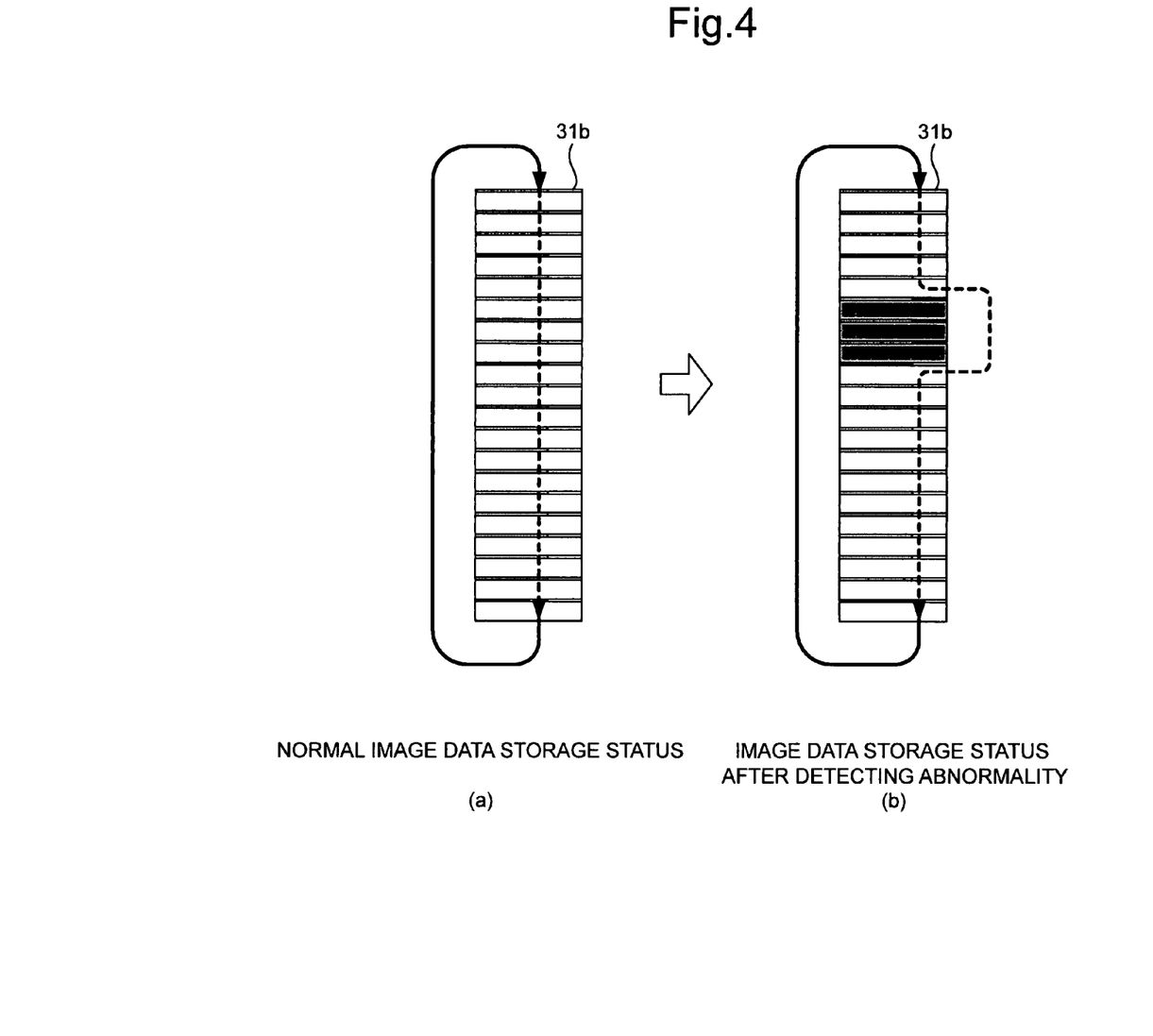
FIG. 4 is a diagram showing storage statuses of the image data in the second storage area (a) before detecting abnormality and (b) after detecting the abnormality.

FIG. 4 is an explanatory diagram showing a method of storing the video data when the abnormality is detected. Note that FIG. 4(*a*) shows a (normal) status of how the image data is stored in the second storage area 31*b* before the abnormality detection sensor 20 detects the abnormality, while FIG. 4(*b*) shows a status of how the image data is stored in the second storage area 31*b* after the abnormality detection sensor 20 has detected the abnormality.

As shown in FIG. 4(*a*), before the abnormality detection sensor 20 detects the abnormality, the image data in every partition is updated in content by overwriting after being temporarily stored. While on the other hand, after the abnormality detection sensor 20 has detected the abnormality, as shown in FIG. 4(*b*), the image data stored till before the predetermined time since the abnormality detection sensor 20 has detected the abnormality are all inhibited from being overwritten, and it follows that the file system function in the present embodiment stores the image data in the remaining partitions other than the partitions stored with the image data inhibited from being overwritten. It is to be noted that the partitions painted in black in their upper right corners represent the partitions in the partitions illustrated in FIG. 4(*b*).

To explain it more specifically, the header information of the image data stored in each partition in the second storage area 31*b* contains an item of write inhibition flag information other than the time information. The status switchover function described above switches over, when the abnormality detection sensor 20 transmits an abnormality detection signal, the write inhibition flag information of a predetermined number of pieces (e.g., three pieces) of image data stored just before that point of time, from a write enabled status to a write disabled status.

On the other hand, the file system function in the present embodiment described above, when writing the image data in each partition of the second storage area 31*b* (when overwriting and thus updating the image data in each partition), reads the write inhibition flag information contained in the header information within the partition, thereby checking whether it is the write enabled status or the write disabled status. Then, the file system function, if in the write enabled status, writes the image data in that partition. Whereas if in the write disabled status, the file system function searches for the partition set in the write enabled status according to the order assigned to each partition, and writes the image data from the searched partition onwards.

Because of being thus configured, as indicated by an arrowhead in FIG. 4(*b*), it follows that the partitions excluding the partitions in the write disabled status are utilized as the image data write target partitions in a way that avoids the write-disabled partitions.

Accordingly, the status switchover function corresponds to a status switchover unit according to the present invention.

Next, a lifetime of the memory card 31 in the present embodiment will be explained.

Given is an explanation of, for instance, a case of using the memory card 31 of which a total capacity is on the order of 8 GB and the writable upper limit count Wt is 100,000. In this case, according to the present embodiment, 4 GB of the total capacity is allocated to the first storage area 31*a*, while the remaining capacity "4 GB" is allocated to the second storage area 31*b*.

Then, when a size of the image generated by the MPEG-4 video encoder 30*f* is 360 p×240 p and when the image encoding rate (output speed) is 350 K [bit/sec], a total capacity of the first storage area 31*a* is given by 4 GB=32768 G [bits]. Therefore, one cycle rewrite time (S/R) needed for rewriting all the image data stored in the first storage area 31*a* is given such as 32768/0.35=93623 [sec]=26 [hours]. Further, the whole rewrite lifetime $\{Wt \times (S/R)\}$ of the first storage area 31*a* is calculated by 100,000×26=2,600,000 [hours]≈296 [years].

Moreover, when a size of the image generated by the MPEG-2 video encoder 30*g* is 720 p×480 p and when the image encoding rate is 3 M [bit/sec], a total capacity of the second storage area 31*b* is given by 4 GB=32768 G [bits]. Therefore, one cycle rewrite time (S/R) needed for rewriting all the image data stored in the second storage area 31*b* is given such as 32768/3=10923 [sec]=3 [hours]. Further, the whole rewrite lifetime $\{Wt \times (S/R)\}$ of the second storage area 31*b* is calculated by 100,000×3=300,000 [hours]≈34 [years].

Note that when in such a status that the image data for 2 hours are inhibited from being overwritten in the second storage area 31*b*, one cycle rewrite time (S/R) is calculated such as 3−2=1 [hour], and hence, if this status continues, the rewrite lifetime $\{Wt \times (S/R)\}$ of the second storage area 31*b* is given by 100,000 [hours]=11 [years].

Thus, even if the compressed video data generated at the low rate by the MPEG-4 video encoder 30*f* and the compressed video data generated at the high rate by the MPEG-2 video encoder 30*g* are written nonstop for 24 hours in the memory card 31, the lifetime of 10 or more years is assured.

Moreover, one cycle rewrite time (S/R) of the first storage area 31*a* is 24 or more hours, and 2 or more hours is ensured as one cycle rewrite time (S/R) of the second storage area 31*b*.

Next, an operation and an effect of the video data transmitting device 30 will be described.

The video data transmitting device 30 in the present embodiment, when the video data are inputted from the monitor camera 10, converts the video data into the digital data, and thereafter writes the compressed video data generated at the low rate by the MPEG-4 video encoder 30*f* and the compressed video data generated at the high rate by the MPEG-2 video encoder 30*g* to the first and second storage area 31*a*, 31*b* of the memory card 31.

Then, before the abnormality detection sensor 20 detects the abnormality, as described above, the image data are overwritten in the sequence from the oldest, whereby N-pieces of image data starting from the point of the time when recording the image data and ending to the point of time tracing back for the predetermined period of time are always temporarily stored in first storage area 31*a* and in the second storage area 31*b* as well.

Then, when the abnormality detection sensor 20 detects the abnormality, in the partitions within the second storage area 31*b*, the predetermined number of partitions to which the image data are written just before the point of time when the abnormality is detected are inhibited from being written, and it follows that the image data from this onward are written to the remaining partitions. Then, some pieces of image data stored without being overwritten to the write inhibition partitions are provided to other computers on the IP network via the LAN controller 30*h* and collected by an administrator visiting the place where this video data transmitting device 30 is installed.

The thus-collected image data are the data compressed by the MPEG-2 video encoder 30*g*, and it is therefore possible to, for example, display on the display device the high-quality image from which characters on a number plate of a car can be read and from which an outline, a facial characteristic and an expression of a person can be recognized. Accordingly, it follows that it is feasible to precisely verify how the abnormality occurs in the monitor object of the monitor camera 10.

On the other hand, even when the abnormality detection sensor 20 detects the abnormality, none of the partitions in the first storage area 31*a* is inhibited from being written, and the writing of the image data continues. This image data is the data compressed by the MPEG-4 video encoder 30*f* and, though not so high in image quality as compared with the image compressed by the MPEG-42 video encoder 30*g*, enables a grasp of shapes and postures of the person and of the car. Accordingly, it follows that when the abnormality occurs, the video data remaining in the first storage area 31*a* are reproduced (played) on the monitor 50 via the IP network and through the video data receiving device 40, also reproduced after being stored in the unillustrated computer and collected in a way that visits the place where the video data transmitting device 30 is installed, thereby verifying the behavior of the person and the motion of the car. Further, one cycle rewrite time is, speaking of the example given above, as long as 26 hours, so that there is no necessity of promptly collecting the video data after the abnormality has occurred.

As described above, according to the present embodiment, the respective pieces of image data are written on the average and impartially to the storage areas of the memory card 31, and hence it does not happen that the lifetime of the storage medium is terminated without consuming up every area of the storage medium because of part of the storage areas reaching the write upper limit count. As a result, there is no necessity of frequently replacing the storage medium.

Further, the memory card 31 is constructed of the flash memory and does not therefore include the movable unit such as HDD (Hard Disk Drive). Accordingly, there occurs neither a backlash of the movable unit due to nonstop activation nor a failure of operation due to the installation environment.

Moreover, as in the present embodiment, both of the low-rate (low image quality) image data and the high-rate (high image quality) image data are stored on the memory card 31, whereby the video can be saved (recorded) for a long period of time, and the image exhibiting the image quality that is high enough to undergo the verification can be stored.

(Note 1)

A video data saving device comprising:

a partition defining unit segmenting a whole storage area of a storage medium constructed of a flash memory and defining a plurality of partitions of which capacities are equal to each other on the segmented areas;

a writing unit attaching, each time image data forming video data is inputted, time information to the image data and writing the image data attached with the time information to the partition stored with the oldest image data in the storage area; and a storing unit storing, each time the writing unit writes the image data to anyone of the partitions, the time information written to the partition and a piece of information specifying a location of the partition in the storage area in a way that associates these items of information with each other.

(Note 2)

A video data saving device according to Note 1, further comprising a status switchover unit setting, when instructed to store the image data, a predetermined number of partitions to which the image data are written just before a point of time when instructed in a write disabled status of the image data, wherein the writing unit, when writing the image data to any one of the partitions, writes the image data to the partition stored with the oldest image data in the partitions excluding the partitions set in the write disabled status of the image data.

(Note 3)

A video data saving device according to Note 2, wherein the writing unit, when writing the image data to any one of the partitions, attaches to the image data, together with the time information, a piece of flag information showing a status purporting that the image data is permitted to be overwritten, and writes the image data attached with these items of information to the partition stored with the oldest image data in the partitions excluding the partitions to which the flag information showing a status purporting that the image data is inhibited from being overwritten, and the status switchover unit switches over, when instructed to store the image data, the flag information of a predetermined number of partitions to which the image data are written just before a point of the time when instructed, from the overwrite permission status to the overwrite inhibition status.

(Note 4)

A video data saving device according to Note 1, further comprising a transmitting unit transmitting, when any one of terminal devices issues a request via a network, the image data stored in the partition set in the write disabled status of the image data to this terminal device.

(Note 5)

A video data saving method comprising:

segmenting equally a whole storage area of a storage medium constructed of a flash memory and defining a plurality of partitions of which capacities are equal to each other on the segmented areas;

attaching, each time image data forming video data is inputted, time information to the image data and writing the image data attached with the time information to the partition stored with the oldest image data in the storage area; and storing, each time the image data is written to any one of the partitions, the time information written to the partition and a piece of information specifying a location of the partition in the storage area in a way that associates these items of information with each other.

(Note 6)

A video data saving program making a computer functions as:

partition defining means segmenting a whole storage area of a storage medium constructed of a flash memory and defining a plurality of partitions of which capacities are equal to each other on the segmented areas;

writing means attaching, each time image data forming video data is inputted, time information to the image data and writing the image data attached with the time information to the partition stored with the oldest image data in the storage area; and storing means storing, each time the writing means writes the image data to any one of the partitions, the time information written to the partition and a piece of information specifying a location of the partition in the storage area in a way that associates these items of information with each other.

What is claimed is:

1. A video data saving device comprising:
   a partition defining unit configured to segment a whole storage area of a storage medium constructed of a flash memory into a plurality of partitions of which capacities are equal to each other;
   a storing unit; and
   a writing unit configured to write, in the storage medium, an input image data with writing time information in a partition, in which no image data is written or an image data other than the input image data is written with oldest writing time information, among the plurality of the partitions in the storage medium, configured to write, in the storing unit, the writing time information, which includes a time when the input image data was written in the storage medium, and configured to write, in the storing unit, a piece of information specifying a location of the partition in the storage area of the storage medium in a way that associates these items of information with each other,
   wherein the writing unit writes the input image data with the writing time information in the partition in which no image data is written when there is at least one partition in which no image data is written in the plurality of partitions, and writes the input image data with the writing time information in the partition in which the image data other than the input image data is written with the oldest writing time information when there is no partition in which no image data is written in the plurality of partitions, and
   the storing unit is a volatile memory.

2. A video data saving device according to claim 1, further comprising a status switchover unit setting, when instructed to store the image data, a predetermined number of partitions in which image data are written just before a point of time when instructed in a write disabled status of the image data,
   wherein said writing unit, when writing the image data in any one of said partitions, writes the image data in a partition stored with oldest writing time information excluding partitions set in a write disabled status of the image data.

3. A video data saving device according to claim 2, wherein said writing unit, when writing the image data in any one of said partitions, attaches flag information showing a status purporting that the image data is permitted to be overwritten, and writes the image data attached with writing information to a partition stored with the oldest writing time information excluding partitions to flag information showing a status purporting that the image data is inhibited from being overwritten, and
   said status switchover unit switches over, when instructed to store the image data, flag information of a predetermined number of partitions to which the image data are written just before a point of the time when instructed, from an overwrite permission status to an overwrite inhibition status.

4. A video data saving device according to claim 2, comprising a transmitting unit transmitting, when any one of terminal devices issues a request via a network, image data stored in partition set in a write disabled status of the image data to this terminal device.

5. A video data saving method comprising:
   segmenting equally a whole storage area of a storage medium constructed of a flash memory and into a plurality of partitions of which capacities are equal to each other;
   writing, in the storage medium, an input image data with writing time information in a partition, in which no image data is written or an image data other than the input image data is written with oldest writing time information, among the plurality of the partitions in the storage medium; and
   writing the writing time information, which include a time when the input image data was written in the storage medium, and writing, in a storing unit, a piece of information specifying a location of the partition in the storage area of the storage medium in a way that associates these items of information with each other, in a volatile memory,
   wherein the writing writes the input image data with the writing time information being in the partition in which no image data is written when there is at least one partition in which no image data is written in the plurality of partitions, and writes the input image data with the writing time information being in the partition in which the image data other than the input image data is written with the oldest writing time information when there is no partition in which no image data is written in the plurality of partitions.

6. The video data saving device according to claim 1 comprising:
   a processing unit which reads time information to image data and head sector address information of each of storage area of the volatile memory storing unit, and generates time information written to a partition and a piece of information specifying a location of a partition in the storage area in a way that associates these items of information with each other on the volatile memory storing unit.

7. The video data saving device method according to claim 5 comprising:
   reading time information to image data and head sector address information of each of storage area of the volatile memory storing unit; and
   generating time information written in a partition and a piece of information specifying a location of the partition in the storage area in a way that associates these items of information with each other on the volatile memory storing unit.

8. A data device comprising:
   a storage of a storage medium segmented into a plurality of partitions; and
   a writing unit configured to write, in the storage medium, an input image data with writing time information, in which no image data is written or an image data other than the input image data is written with oldest writing time information, among the plurality of the partitions in the storage medium, configured to write, in a storing unit, the writing time information which includes a time when the input image data was written in the storage medium, and configured to write, in the storing unit, information specifying a location of the partition in the storage of the storage medium in a way that associates these items of information with each other in a volatile memory, wherein
   the writing unit writes the input image data with the writing time information in the partition in which no image data is written when there is at least one partition in which no image data is written in the plurality of partitions, and writes the input image data with the writing time information in the partition in which the image data other than the input image data is written with the oldest writing time information when there is no partition in which no image data is written in the plurality of partitions.

* * * * *

UNITED STATES PATENT AND TRADEMARK OFFICE
CERTIFICATE OF CORRECTION

PATENT NO. : 8,305,463 B2  
APPLICATION NO. : 11/513094  
DATED : November 6, 2012  
INVENTOR(S) : Yasushi Umezaki et al.

Page 1 of 1

It is certified that error appears in the above-identified patent and that said Letters Patent is hereby corrected as shown below:

Column 12, Line 32, In Claim 7, after "saving" delete "device".

Signed and Sealed this  
Twelfth Day of March, 2013

Teresa Stanek Rea  
*Acting Director of the United States Patent and Trademark Office*